March 19, 1957  A. J. MATTER  2,785,906
HAND BAGGAGE CART HAVING AUTOMATIC BRAKE
Filed Nov. 15, 1954  3 Sheets-Sheet 3
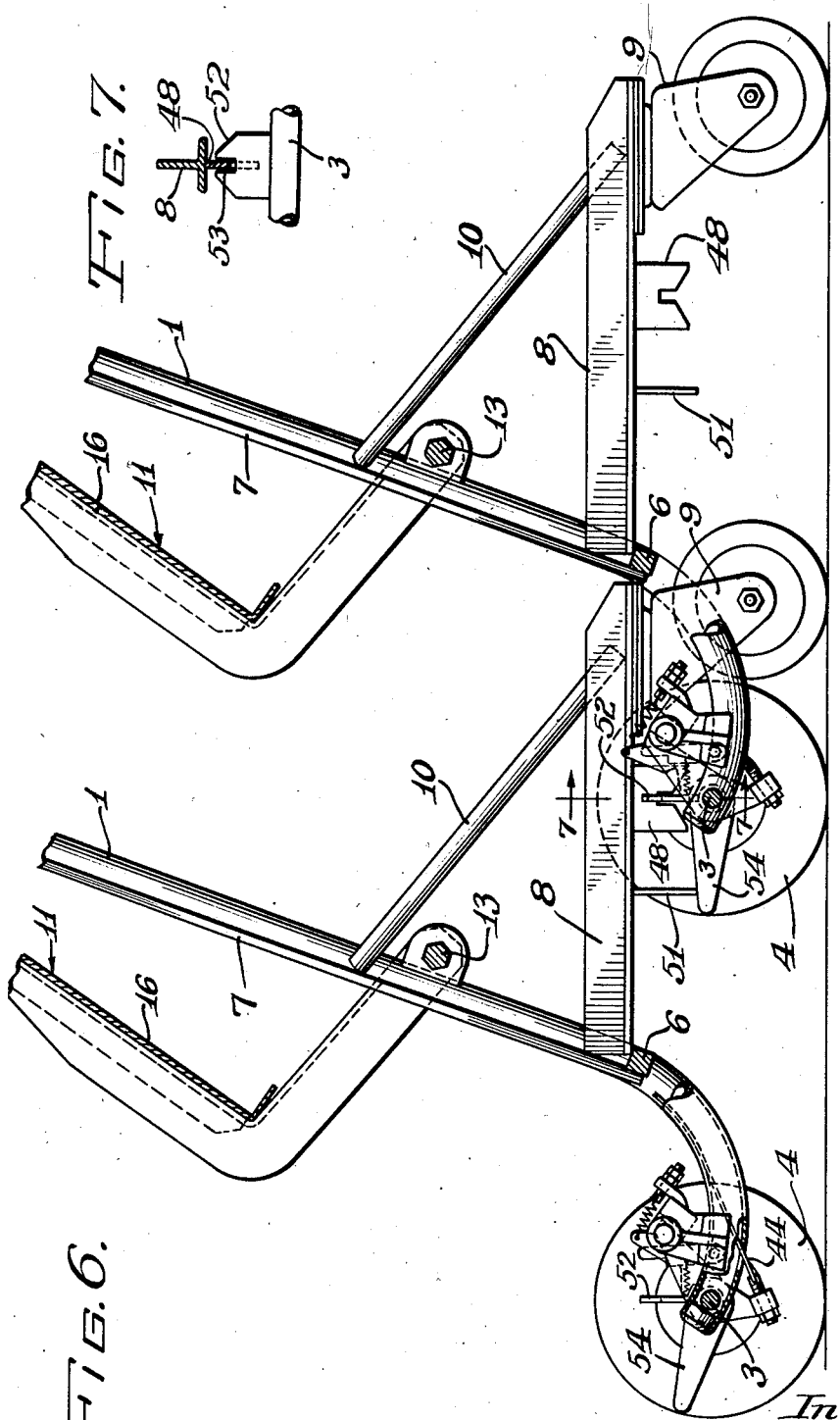

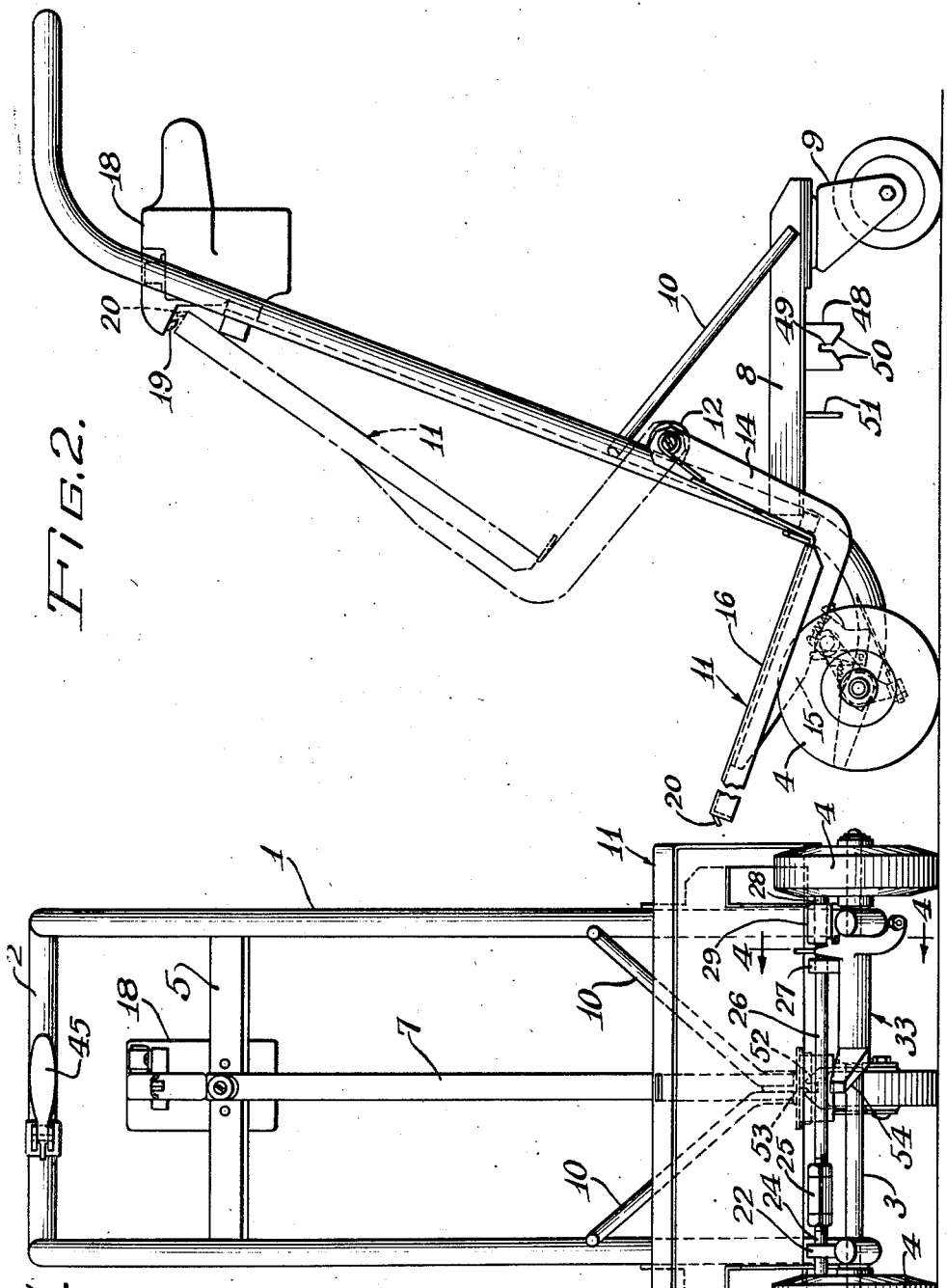

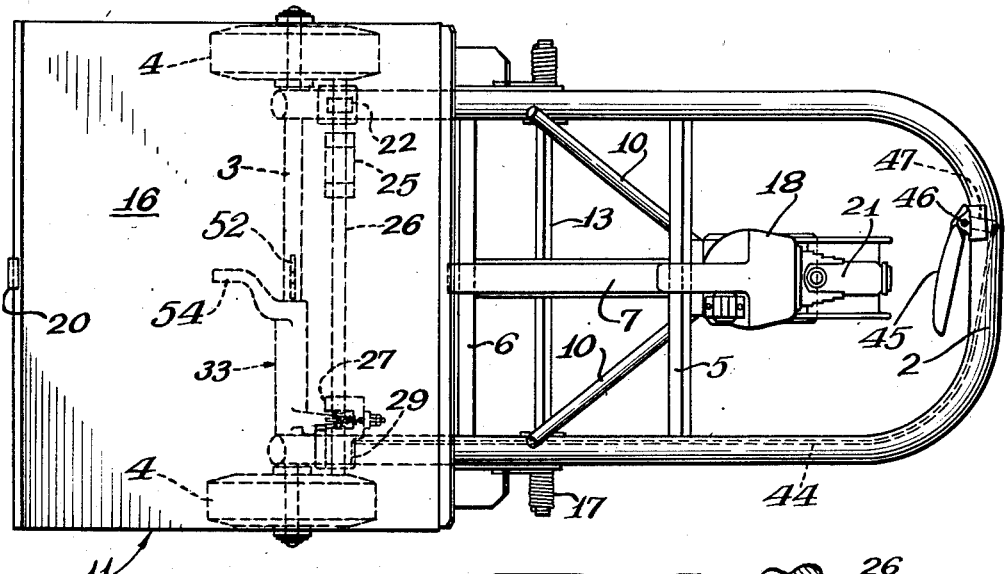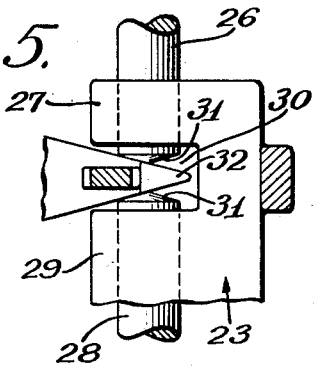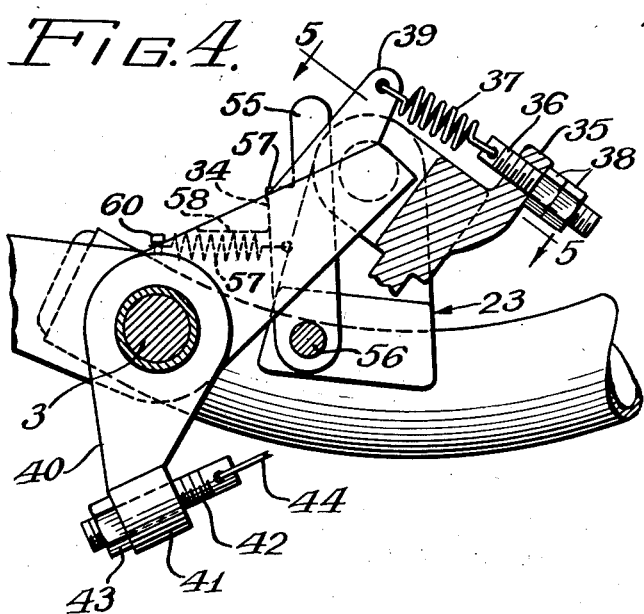

United States Patent Office 2,785,906
Patented Mar. 19, 1957

2,785,906

HAND BAGGAGE CART HAVING AUTOMATIC BRAKE

Albert J. Matter, Chicago, Ill., assignor to U-Kart, Inc., Chicago, Ill., a corporation of Illinois Application November 15, 1954, Serial No. 468,843

8 Claims. (Cl. 280—33.99)

This invention relates to improvements in a hand cart for baggage and refers particularly to a hand cart having a normally applied brake, the cart being capable of being nested with similar carts whereupon the brakes of the nested carts with the exception of one will be automatically released whereby the entire group of nested carts can be moved by one operator.

In patent application Serial No. 215,895, filed March 16, 1951, issued into Patent No. 2,693,968, a hand cart for baggage is described. The hand cart described in said patent application is devised for use in railroad stations, but depots, docks and the like wherein a passenger by depositing a coin in a coin box carried by the cart renders the cart operative whereby the passenger may load his baggage upon the cart and wheel the same to his destination within the station, depot or dock.

The present invention is an improvement upon the cart described in the patent application hereinbefore identified and contemplates a cart which carries a normally applied brake which prevents unintentional rolling movement of an unattended cart, the brake being releasable by the operator during use of the cart.

A further feature of the invention resides in a hand cart construction so contrived that a plurality of said carts may be nested and locked together for mass movement of the nested carts by a single operator.

As a very important features of the present invention, the brake releasing mechanism of each cart is so devised that when the carts are in nested position the brakes upon all but one of said nested carts are automatically released whereby the nested carts may be conveniently wheeled together by a single operator who is required only to manually release the brake of the cart whose brake was not automatically released.

Other objects and advantages of the present invention will be apparent from the accompanying drawings and following detailed description.

In the drawings,

Fig. 1 is a front elevational view of a hand cart embodying the concepts of the present invention.

Fig. 2 is a side elevational view of the cart shown in Fig. 1.

Fig. 3 is a top plan view of the cart shown in Figs. 1 and 2.

Fig. 4 is an enlarged detailed sectional view of the brake lever taken on line 4—4 of Fig. 1.

Fig. 5 is a detailed sectional view taken on line 5—5 of Fig. 4.

Fig. 6 is a fragmentary elevational view, parts being broken away and parts being shown in section, of two nested carts.

Fig. 7 is a detailed sectional view taken on line 7—7 of Fig. 6.

Referring in detail to the drawings, 1 indicates a frame which is substantially U-shape and which may comprise a unitary piece of metal tubing, such as, steel, aluminum, or the like. The tubing is bent intermediate its length to provide a handle 2 which is bent backwardly for convenience in propelling the cart. The ends of the tubing are bent forwardly, providing spaced arms for the support of an axle 3 upon which rubber-tired wheels 4 are mounted. The frame also carries cross-braces 5 and 6 which function to space the upright members comprising the frame. A longitudinal brace 7 joins the cross-braces 5 and 6 and functions to strengthen the frame structure.

A T-iron member 8 extends rearward from the lower portion of the frame and supports a ball bearing caster wheel 9, the caster being of conventional structure whereby the wheel is freely swingable about a substantially vertical axis. A pair of braces 10 are connected with the upright members of the frame and are secured at their opposite ends to the member 8 adjacent the caster wheel 9. Thus, the frame is supported upon wheels 4 and 9 and may be wheeled forwardly or backwardly or moved in a curved path depending upon the nature of the force exerted upon the handle 2 by an operator.

A baggage platform 11 is positioned upon the frame for swingable movement. Each upright member of the frame carries an apertured lug or bracket 12 which is adapted to support a shaft 13. The baggage platform comprises a pair of spaced supporting arms 14 which at their corresponding ends are journaled for swingable movement upon shaft 13, said arms being bent at substantially right-angles intermediate their length to form spaced supports 15 for a panel 16. Coil springs 17 embrace the opposite ends of shaft 13 and bias the platform 11 for swingable movement in a clockwise direction about shaft 13, as viewed in Fig. 2. In operative position the platform 11 is supported above the wheels 4, as shown in full lines in Fig. 2. In this position, the platform is operative to receive and support baggage. However, the platform 11 occupies the operative position against the torsion of springs 17 and when not constrained by the weight of the baggage or the hand of an operator, the platform tends to swing to the position shown in broken lines in Fig. 2.

A conventional coin-controlled latch mechanism 18 is mounted upon the cross-brace 5, the latch comprising a movable keeper 19 which, when the platform is in inoperative position, engages a tongue 20 carried upon the platform to hold the platform in inoperative position.

In inoperative position keeper 19 retains the platform 11 in upraised position and the keeper can only be retracted by the insertion of a coin in a coin slide 21, comprising a portion of the mechanism 18, and movement of the coin slide into the case of the device 18. The coin-controlled mechanism 18 is conventional and, per se, constitutes no part of the present invention.

As a feature of the present invention a brake is contemplated for preventing unintended rolling of the cart. The brake mechanism comprises a bracket 22 which is mounted upon one of the arms of the frame. A slotted bracket 23 is similarly mounted upon the opposite frame arm. The bracket 22 comprises a sleeve in which a brake rod 24 is slidably movable, one end of said rod terminating adjacent a wheel 4 and the opposite end being threaded into an adjustable coupling 25. A rod 26 is threaded into the opposite end of coupling 24 and its opposite end is slidably positioned in a sleeve portion 27 of bracket 23. A shaft 28 is slidably received in sleeve portion 29 of bracket 23, the adjacent ends of the rods protruding into the space 30 provided between the sleeve portions 27 and 29. The opposite end of rod 28 terminates adjacent a wheel 4.

As will be hereinafter more fully described, the brake is normally applied, that is, the ends of rods 24 and 28 adjacent wheels 4 are in frictional contact with the respective wheels. To maintain the rods 24 and 28 in this position, the adjacent ends of rods 26 and 28 in the space 30 are tapered conically, as at 31 in Fig. 5, and a spring impelled wedge member 32 is normally urged between the tapered ends 31. By the provision of the coupling 25 the cumulative effective length of rods 24 and 26 may be adjusted.

A brake lever sleeve 33 is rotatably positioned upon shaft 3. An arm 34 is formed integral with said sleeve and extends radially therefrom, the end portion of said arm comprising the wedge member 32 which separates the rods 26 and 28 to apply the brake. A lug 35 is formed integral with bracket 23, said lug carrying a threaded pin 36 which functions as an anchorage for coil spring 37, the pin 36 being adjustable in the lug 35 by means of nuts 38. The opposite end of spring 37 is secured to finger 39 which comprises a portion of the arm 34. The arrangement is such that normally spring 37 functions to urge arm 34 in a clockwise direction about shaft 3, as viewed in Fig. 4, and thus the wedge member 32 is resiliently urged between the abutting ends 31 of the rods 26 and 28.

An arm 40 is also formed integral with the sleeve 33, said arm extending radially from said sleeve. At its outer end arm 40 carries a sleeve portion 41 adapted to threadedly receive pin 42 which is adjustably positioned in the sleeve portion 41 by means of nut 43. A flexible cable 44 is secured at one end to pin 42 and said cable is threaded through one of the upright members of the tubular frame to the central portion of the handle 2. A hand grip 45 is pivotally mounted, as at 46, upon a portion of the handle 2 of the frame and said handle is rigidly connected to a link 47 positioned within the tubular handle 2. The opposite end of the flexible cable 44 is secured to the link 47.

The arrangement is such that when the hand grip 45 is rocked about the pivot point 46, which motion is accomplished by an operator who may squeeze the hand grip 45, the cable 44 is tensioned and hence arm 40 is rocked thereby rocking the sleeve 33. The sleeve 33 is rocked in a counter-clockwise direction, as viewed in Fig. 4, and such movement causes arm 34 to move in a counter-clockwise direction against the tension spring 37. The movement of arm 34 is of such degree, when the hand grip 45 is squeezed, that the wedge member 32 is removed from engagement between the ends 31 of the rods 26 and 28. In this fashion the rods 24 and 28 are no longer urged into frictional contact with the wheels 4 and hence the cart may be freely wheeled. Hence, when it is desired to move the cart, the operator grips the hand grip 45 and squeezes the same toward the tubular handle 2. This operation releases the brake and the cart may be wheeled as desired. However, when the operator's hand is released from the grip 45, spring 37 rocks lever arm 34 in a clockwise direction about shaft 3, as viewed in Fig. 5, and the brake is again applied by the movement of the wedge member 32 into contact with the ends 21 of the rods 26 and 28. Accordingly, whenever a cart is left unattended the brake is locked and hence the cart will not roll haphazardly about the station or depot floor.

A lug 48 is mounted upon the lower surface of the T-iron 8 intermediate its length, the lug being provided with a slot 49, the defining arms of which are tapered adjacent the ends as at 50 in Fig. 2. The plane of the lug 48 is in substantial alignment with the length of the T-iron 8. A second lug 51 is positioned upon the lower surface of the T-iron 8 and is spaced from lug 48 toward the forward end of the cart. The plane of lug 51 is at substantially right angles to the length of the T-iron 8. A lug 52 is carried upon axle 3 and extends upwardly therefrom, said lug being provided with a slot 53.

The arrangement is such that the carts may be disposed in nested relationship, as shown in Fig. 6, the lugs 48 and 52 cooperating to lock one cart to an adjacent cart. To nest the carts the rear end portion of the T-iron 8, that is, that portion which carries the caster wheel 9, is lifted to an elevation about the axle of the cart with which it is to be nested. The forward cart is then moved rearwardly toward the rear cart until the slots 49 and 53 of the lugs 48 and 52 are brought into interlocking engagement. The carts will then be disposed in the fashion shown in Fig. 6 wherein the caster wheel 9 of the forward cart is disposed rearwardly of the main wheels 4 of the rear cart. Thus, the carts are disposed in locked position with respect to each other and if the brakes of both carts were released, the carts could be moved as a unit.

Although the nesting of two carts has been illustrated and described, it is to be understood that any number of carts may be nested and locked together in the fashion hereinbefore described.

The brake lever sleeve 33 carries an arm 54 which is spaced from the arms 34 and 40 toward the central portion of the axle 3. The arm 54 extends substantially radially from the axle 3 and normally projects in a forward direction relative to the axle. As has been hereinbefore described, the brake upon each cart is normally applied and can be released by the manipulation of the hand grip 45 when the cart is to be used. When a number of carts are to be nested, however, and it is desired to roll or wheel the group of carts as a unit, it would be most inconvenient to release all of the brakes by means of the hand grips 45. Accordingly, when the carts are in nested relationship and the lugs 48 and 52 are in engagement, the lug 51, disposed forwardly of the lug 48, rests upon the end of lever 54. In this fashion the lever 54 is so rocked as to disengage the wedge member 32 from between the rods 26 and 28. Hence, when the carts are disposed in nested relationship the brakes of all of the carts except the cart most forward in the nested line of carts are released by the interengagement of the lug 51 of a forward cart with the arm 54 of a rear cart. If an operator desires to move the nested group of carts, it is merely necessary for the operator to manipulate the hand grip 45 of the front cart and hence all of the carts will be in condition to be wheeled and all of said carts may be wheeled as a unit. On the other hand, when the carts have been wheeled to a desired location the mere releasing of the hand grip 45 applies the brake of the front cart which will prevent rolling movement of the group of nested carts. If, when the carts are nested the operator finds it inconvenient to manipulate the hand grip 45 of the front cart, means is provided for holding the brake released without the manipulation of the hand grip 45 or without the necessity of rocking the arm 54 by the engagement of the lug 51. A lever 55 is pivotally mounted, as at 56, upon bracket 23. The lever 55 carries a shoulder 57 which is disposed adjacent a triangular protuberance 58 formed integral with arm 34. A coil spring 59 is anchored at one end upon lever 55 and at the opposite end said coil spring is anchored upon a pin 60 carried upon the sleeve 33. During the normal operation of the brake of the cart the edge of the lever 55 adjacent the protuberance 58 slides upon said protuberance but the throw of the arm 34 when operated by either the hand grip 45 or the arm 54 is not sufficient to cause engagement of the lower portion of the proturberance 58 with the shoulder 57. Hence, during the normal operation of the brake the lever 55 is substantially inoperative.

However, when a group of carts are nested, as hereinbefore described, and it is desired to retain the brake of the front cart released, the operator may swing the sleeve 33 through an angle greater than the angle at which it would be swung by the manipulation of the hand grip 45 or by the action of the arm 54, the angle through which the sleeve may be swung being sufficient to permit the shoulder 57 to move beneath the proturberance 58. After the shoulder 57 has been engaged with the lower portion of the protuberance 58 it is held there by the coil spring 59 and hence the sleeve 33 is prevented from rocking in the opposite direction such as to reapply the brake. In this fashion the brake of any one of the carts or of the front cart of a nested group of carts may be released and held in released position.

In normal operation, however, the lever 55 is not manipulated by an operator or passenger who may wish to make normal use of the cart. The lever 55 would normally be for the use of an attendant whose duty it would be to assemble the carts in nested fashion and move them from place to place throughout the station, depot or dock. After the nested group of carts are moved, the attendant can then release the lever 55 from its engagement with the protuberance 58 whereby the front cart of the nested group of carts will have its brake applied and will prevent inadvertent movement of the group of carts.

The present invention illustrates and describes a specific type of brake which may be used for a hand baggage cart and a specific means of releasing the brakes of a nested group of carts. The invention broadly, however, is directed to the broad concept of a cart having brakes which may be automatically released when two or more carts are disposed in nested relation.

I claim as my invention:

1. A baggage cart comprising in combination a frame, wheels for supporting said frame, a normally applied brake for said cart to prevent free rolling movement of said card on said wheels, means carried by said cart for releasing the brake, means carried by said cart for engaging a similar cart in nested fashion whereby the nested carts are locked together as a unit, and separate means carried by each cart for actuating the brake-releasing means of an adjacent nested cart to release the brake thereof when the carts are in nested relationship.

2. A baggage cart comprising a frame, wheels for supporting said frame, a normally applied brake for said wheels, means carried by said frame for releasing the brake on the wheels of said cart, means carried by said cart for engaging a similar cart in nested fashion whereby the nested carts can be wheeled as a unit, and separate means carried by each cart for actuating the brake-releasing means of an adjacent nested cart to release the brake thereof when the carts are in nested relationship.

3. A baggage cart comprising a frame, wheels for supporting said frame, a platform for baggage swingably mounted on said frame to an operative and inoperative position, a normally applied brake for said cart to prevent free rolling movement of said cart on said wheels, means carried by said cart for releasing the brake, means carried by said cart for engaging a similar cart in nested fashion when the platforms of said carts are in inoperative position whereby the nested carts can be wheeled as a unit, and separate means carried by each cart for actuating the brake-releasing means of an adjacent nested cart to release the brake thereof when the carts are in nested relationship.

4. A baggage cart comprising a frame, wheels for supporting said frame, a normally applied brake for said wheels, manual control means carried by said cart for manually releasing the brake on the wheels of said cart, a second control means carried by said cart for releasing the brake on the wheels of said cart, means carried by said cart for engaging a similar cart in nested fashion whereby the nested carts can be wheeled as a unit, and means carried by each cart for actuating the second brake releasing control means of an adjacent nested cart to release the brake thereof when the carts are in nested relationship.

5. A baggage cart comprising a frame, wheels for supporting said frame, a baggage platform swingably positioned upon said frame for movement into an operative and an inoperative position, resilient means for biasing said platform to return it to inoperative position when not restrained by an outside force, a normally applied brake for the wheels of said cart, manual control means for releasing said brake while the control means is actuated, a second control means carried by said cart for releasing the brake on the wheels of said cart while said second control means is actuated, means upon said cart for engaging a similar cart in nested fashion when the platform is swung to inoperative position whereby the nested carts can be wheeled as a unit, and means carried by each cart for actuating said second brake releasing control means of an adjacent nested cart to hold the brake in released position while the carts are in nested relationship.

6. A baggage cart comprising a frame, wheels for supporting said frame, a brake for said wheels, resilient means for holding said brake in normally applied position, means carried by said frame for releasing the brake on the wheels of said cart against said resilient means, means carried by said cart for engaging a similar cart in nested fashion whereby the nested carts can be wheeled as a unit, and separate means carried by each cart for actuating the releasing means of an adjacent nested cart to release the brake thereof while the carts are in nested relationship.

7. A baggage cart comprising a frame, a handle portion on said frame, wheels supporting said frame for wheeled movement thereof, a brake for said wheels, resilient means for holding said brake in applied position, means carried by said handle for holding said brake in released position against said resilient means, a second means carried by said frame for holding said brake in released position, separate means carried by said cart for engaging a similar cart in nested fashion whereby the nested carts can be wheeled as a unit, and means carried by each cart for actuating the second holding means of an adjacent nested cart to hold the brake thereof in released position while the carts are in nested relationship.

8. A baggage cart comprising a frame, wheels for supporting said frame, a brake for said wheels, resilient means for normally applying said brake, manually operable means on said frame for opposing said resilient means to temporarily hold said brake in released position while said manual means is operated, means carried by said cart for engaging a similar cart in nested fashion whereby said nested carts can be wheeled as a unit, a second means carried by the cart for opposing said resilient means to hold the brake in released position, separate means on said cart for actuating the second releasing means of an adjacent cart while said carts are in nested relationship, a third means carried by said frame for opposing said resilient means to hold the brake in released position, and latch means for locking said third means in brake-releasing position.

References Cited in the file of this patent
UNITED STATES PATENTS

| | | |
|---|---|---|
| 482,708 | Watkins | Sept. 13, 1892 |
| 1,641,371 | Carlson | Sept. 6, 1927 |
| 2,238,322 | Hodaly | Apr. 15, 1941 |
| 2,253,791 | Kline et al. | Aug. 26, 1941 |
| 2,583,513 | Maslow | Jan. 22, 1952 |
| 2,693,968 | Bateman et al. | Nov. 9, 1954 |